United States Patent
Foran et al.

(10) Patent No.: US 7,483,858 B2
(45) Date of Patent: Jan. 27, 2009

(54) NETWORK-BASED SYSTEM

(75) Inventors: John Anthony Foran, Dublin (IE); Joseph Patrick Corcoran, Dublin (IE)

(73) Assignee: Internet Payments Patents Ltd., County Wicklow (IE)

( * ) Notice: Subject to any disclaimer, the term of this patent is extended or adjusted under 35 U.S.C. 154(b) by 1248 days.

(21) Appl. No.: 10/216,225

(22) Filed: Aug. 12, 2002

(65) Prior Publication Data
US 2003/0126064 A1 Jul. 3, 2003

Related U.S. Application Data

(63) Continuation-in-part of application No. PCT/IB01/00022, filed on Feb. 12, 2001.

(30) Foreign Application Priority Data
Feb. 11, 2000 (IE) .............................. S2000-0121

(51) Int. Cl.
*G06Q 40/00* (2006.01)
(52) U.S. Cl. .......................................... 705/39; 705/44
(58) Field of Classification Search .................. 705/39
See application file for complete search history.

(56) References Cited

U.S. PATENT DOCUMENTS

| | | | |
|---|---|---|---|
| 3,573,747 A * | 4/1971 | Adams et al. | 705/37 |
| 4,789,928 A * | 12/1988 | Fujisaki | 705/37 |
| 4,799,156 A * | 1/1989 | Shavit et al. | 705/26 |
| 5,168,446 A * | 12/1992 | Wiseman | 705/37 |
| 5,325,297 A * | 6/1994 | Bird et al. | 715/530 |
| 5,710,887 A | 1/1998 | Chelliah et al. | |
| 5,903,721 A | 5/1999 | Sixtus | |
| 5,920,847 A | 7/1999 | Kolling et al. | |
| 6,058,417 A * | 5/2000 | Hess et al. | 709/219 |
| 6,466,917 B1 * | 10/2002 | Goyal et al. | 705/18 |

FOREIGN PATENT DOCUMENTS

| | | |
|---|---|---|
| EP | 0 940 785 A2 | 9/1999 |
| EP | 1 017 030 A2 | 7/2000 |
| WO | 98/14921 A1 | 4/1998 |
| WO | 99/66436 A1 | 12/1999 |

* cited by examiner

*Primary Examiner*—Kambiz Abdi
*Assistant Examiner*—Lindsay M. Maguire
(74) *Attorney, Agent, or Firm*—Ruttler IP Law PLLC; James J Ruttler

(57) ABSTRACT

A transaction settlement system and method for internet and other trading over a telecommunications network. Customer computers and merchant computers are connected to customer account servers and merchant account servers respectively, the former maintains a customer account and conducts the financial aspects of the transaction with the merchant server without revealing the customers identity. The sequence of the messages are such that once in message M4, the customer computer instructs the customer accounts server to accept the transaction and the customer accounts server accepts it, the customer accounts server deals with the merchant accounts server to settle the account in accordance with agreed procedures. The merchant can have surely of payment. There is also provided methods to deliver coupons, e.g. discount coupons and to ship goods with anonymity.

24 Claims, 8 Drawing Sheets

NETWORK-BASED SYSTEM

PRIORITY CLAIM

This application is a Continuation-In-Part of co-pending PCT International Application No. PCT/IB01/00022 filed on Feb. 12, 2001, which was published in English and which designated the United States and on which priority is claimed under 35 U.S.C. §120, the entire contents of which are hereby incorporated by reference. PCT International Application No. PCT/IB01/00022 filed on Feb. 12, 2001 is an international application of Application No. S2000-0121 filed in Ireland on Feb. 11, 2000, which priority is claimed.

INTRODUCTION

The present invention relates to a method of conducting a transaction in a trading system. The invention is particularly directed to a trading system where a merchant sends goods and/or services to a customer when the customer is generally located remotely from the merchant. The invention is also directed towards providing a system for carrying out such transactions. The invention is particularly directed to the carrying out of the financial transactions and is not concerned particularly with the actual method of trading.

BACKGROUND OF THE INVENTION

There are many payment systems available. For example, U.S. Pat. No. 5,920,847 (Visa) describes a bill payment system wherein participating consumers pay bills to participating billers through a payment network operating according to preset rules. Many use various forms of payment message. It is also known to provide systems where there are secret passwords or the like used to authenticate the payments and in particular, the payment of transactions in electronic commerce, such as, for example, described in PCT Patent Specification No. WO 98/14921 (Certco LLC). Other systems have been directed towards providing a method of making small payments, referred to as micropayments, for trading on the internet. A typical example of such a patent specification is WO 99166436 (Protx Limited).

There are many methods of trading over the Internet and the present invention is not directed to such methods, whether they be quotations systems, brokering systems, methods of filling and replenishing shopping baskets, and so on.

Presently, there are numerous systems for trading on the Internet. The most common form of settling a payment between a customer and a merchant is with the customer using a credit card. The customer gives the merchant the customer's credit card details in order to effect a transaction. Essentially, before a merchant can get paid, the merchant has to check that the credit card is valid and that further, the person using the credit card is the authorised person. Generally, this is carried out by the merchant authorising the transactions with some clearing or authorising agency. The merchant, if the merchant is to be paid must validate the identity of the card holder before concluding the transactions, otherwise, the merchant may be liable for any fraud that may be committed. Merchants cannot carry out authentication of every transaction and therefore suitable checking does not occur in practice. Many transactions are only validated in batch by a clearing or acquirer bank later than the trade was carried out or alternatively, merchants accept the validity or at least assume the validity of a credit card number proffered when the value of the trade is below some predetermined amount. These systems leave the merchant wide open to fraud and to abuse by those wishing to carry out a trade with the merchant using a stolen credit card number. It is important to appreciate that it is only the number that needs to be stolen. This, therefore, leads directly to the problem for the consumer in that, if the consumer releases his or her credit card number, they have no control subsequently on a third party illegally using that credit card number in Internet trading.

Due to the explosion of Internet trade recently, fraudulent use of credit cards has become a problem. Because the Internet shields the identity of the person using the credit card, all that is required is that a fraudster acquires the details of a valid credit card. These details can then be used, as suggested above, to purchase goods and services below a specific monetary value without detection. Several security systems have been developed to combat this problem, including complex encryption methods, certification systems and third party verification systems. None of these systems can prevent all types of fraud and most only act as a confidence builder for the customer. Currently, because of inefficiencies with regard to time delay and because of the cost and effort in effecting authorisation and authentication, the majority of systems are implemented such that transactions below a certain value bypass most of the security systems. A problem associated with complex security systems used to prevent fraud is that they add to the cost of and delay the completion of each transaction. They require the card holder to supply to the merchant personal details of the customer that restrict the ease of use of these security systems. It is off-putting and time consuming for the customer to enter all these details. Another problem for the customer is that the security systems introduce a delay for the customer which can be quite annoying and infuriating for the customer trying to effect a trade on the Internet. This tends to discourage people carrying out transactions on the Internet.

Another problem associated with effecting transactions on the Internet is the fact that any transaction conducted over the Internet costs some amount of money for the credit card company, the cost being a transaction cost rather than a percentage of the value of the transaction. This means that there is a break even point for the credit card company below which the transaction does not make a contribution. This makes credit card payments on the Internet unsuitable for a large number of small value transactions. Another problem associated with effecting transactions on the Internet is the high incidence of disputed payments. Again, these are a source of considerable cost to the financial institution. These may result from fraud, error or even forgetfulness.

One of the effects of the amount of card not present fraud is that consumers are more and more reluctant to disclose their credit card number during this type of trading. There have been too many instances where third parties, not necessarily the merchant, have perpetrated such crimes. In some cases there have been fraudulent merchants who have used a consumer's credit card number to subsequently deliver additional goods to the credit card user, which additional goods the credit card user often has extreme difficulty in returning or refusing to pay for. This type of fraud where the merchant supplies additional goods or services to the consumer because the merchant has got the consumer's credit card number, is on the increase. A further problem is that, for example, some employee of a merchant or some other third party may obtain details of a customer's credit card number and even more importantly, may obtain details that are required to authenticate the credit card such as, for example, the consumer's age, address and other personal information that is required by many an acquiring bank before they will clear a credit card transaction over a certain amount. Thus, the consumer, in addition to not wishing to disclose his or her credit card number, is now extremely reluctant to disclose those personal details which would allow the consumer to be more closely identified and even more so, to have their credit card number more easily authenticated.

In some ways, these problems are exacerbated, as mentioned above, in relation to small amounts of money. People wish to use the Internet to trade but they wish to do it simply and efficiently. If you have to carry out the same transaction procedures and the same authentication to have a payment for a minor sum of money cleared, as you do for a major amount, then using this form of credit card payment over the Internet becomes virtually unworkable. It is too cumbersome for the consumer and too expensive for the merchant and financial institutions.

A further problem for the consumer which is not necessarily directly related to fraud, although obviously partially concerned therewith, as explained above, is the question of anonymity. The consumer, for many reasons, may not wish to give his or her name and, even more importantly, address to a merchant. There can be many reasons for this such as, for example, the consumer may not wish other people to know that they have purchased from that particular site or the consumer may not wish to be subsequently bombarded with what is effectively junk mail from that particular merchant. Thus, there are many reasons other than the simple security one whereby the consumer wishes to retain anonymity.

In summary, therefore, the financial institutions want to, as far as possible, have a system that will allow the consumer purchase over the Internet which will be efficient, relatively inexpensive and, as important, profitable for the financial institution. The financial institution does not want to be clearing relative small sums of money for transactions on a regular basis, nor indeed does it want to be accounting individually to a merchant for these small sums of money as the total cost of handling the transactions becomes inordinate. For the merchant, they want to be able to be paid efficiently and effectively. The merchant wants to avoid cumbersome systems that may or may not protect him from fraud. They want to be able to supply the goods and/or services to the customer with the minimal amount of checking and at the same time, with security that they will subsequently be paid.

Finally, the consumer requires anonymity in many instances and further, requires that an efficient and fraud free method of accounting for such transactions be available. Lastly, the customer wants an accounting system which is accurate and transparent.

OBJECTS OF THE INVENTION

The present invention is directed towards providing efficient and secure transaction settlement and accounting procedures which will overcome the problems referring to above.

SUMMARY OF THE INVENTION

The invention provides a method of conducting a transaction in a trading system where a merchant sends goods and or services to a customer comprising: a customer accounts server; a merchant accounts server; a system services server; merchant computers each having an associated merchant account; customer computers each having an associated customer account; and a telecommunications network interconnecting the servers and the computers, each computer and server having a unique identifier for contact within the network.

The method comprises very many steps. For example, the customer computer and the merchant computer will open communications and the customer computer will communicate its intention to purchase from the merchant computer. Then, the merchant computer will send a merchant transaction identifier number and payment request to the customer computer. Then, in accordance with the invention, the customer computer sends a transaction acceptance message which includes the merchant transaction identifier number and some unique customer transaction identifier to the customer accounts server. The customer accounts server sends a payment acceptance message, including the transaction acceptance message, to the merchant accounts server. The merchant computer sends a transaction acceptance message to the merchant accounts server. Then, the merchant accounts server matches the transaction acceptance message received from the merchant computer and the payment acceptance message received from the customer accounts server.

Finally, the merchant accounts server sends instructions to the system services server to cause payment to the merchant in accordance with an agreed settlement procedure having agreed payment rules. In this way, a secure system has been provided in the sense that the customer has not identified himself or herself in any way to the merchant. At the same time, the merchant is happy in the sense that confirmation of the transaction has been received by the merchant and the merchant can be sure that the account will be paid. The customer can accept the transaction by causing the customer computer to send an acknowledgment message to the merchant computer and/or additionally may, in certain instances, add a customer audit identifier. The advantage of this is that the customer can have a full audit trail of the particular transaction.

Various other messages can be sent, for example, the merchant accounts server can send confirmation of the matching of the transaction acceptance message and the payment acceptance message to the merchant computer or can send confirmation of the matching payment acceptance message and the transaction acceptance message to the customer accounts server.

In many instances, the customer accounts server, before sending the payment acceptance message, will cause the customer account to be debited.

It will be appreciated that the various computers have to be set up to carry out the invention and, for example, in many instances, it will be necessary to prepare the customer account, including payment credit limit rules for the customer. Obviously, this customer account then has to be stored on an account control application in the customer accounts server. This account control application can be downloaded to the customer computer and can be stored on the customer computer. If this happens, then, on receiving a merchant transaction identifier number and payment request from the merchant computer, the customer computer sends the payment request to the account control application and only if the payment request is within the payment credit limit rules does the customer computer carry out the step of accepting the transaction.

Very often, on the payment request being sent to the account control application, the customer account is debited. In this way, there could be no question of a customer exceeding his or her credit limit.

Various other messages may be sent such as, for example, the merchant computer can send detailed product and billing information with a merchant transaction identifier number and payment request to the customer computer. Alternatively, this can be sent, firstly, to the customer accounts server and then from the customer accounts server to the customer computer. Any and all of the information may be stored. Various ways of crediting the merchant account and debiting the customer account may be used.

One of the major problems which arises very often when a transaction requires the physical delivery of goods by way of a package is that the customer wishes to be anonymous. Therefore, the customer will inform, through the customer computer, the merchant that he or she wishes to retain anonymity and then, either the customer computer or the merchant computer will nominate a preferred shipper having a shipper computer connected to the telecommunications network. Then, once that happens, effectively, the shipper becomes a barrier between the merchant computer or merchant and the customer computer or customer. Then, sufficient information is sent to the shipper so that the shipper can receive the goods or package from the merchant for delivery. Indeed, at that stage, the shipper may not even know the destination address which may not be given to the shipper until the package has been entrusted to the shipper. Subsequently, the shipper carries out the delivery without ever revealing the shipping address to the merchant.

Further, the various messages regarding confirmation of delivery may be sent from various parties such as, for example, the shipper computer to the customer accounts server and from the customer accounts server to the merchant accounts server and then, possibly, from the merchant accounts server to the merchant computer.

In other instances, when the transaction requires the delivery of goods to the customer, the customer may not be willing to pay for the goods until the goods have been received. This could either require a simple proof of delivery or a request to ensure that the goods, when received, were of merchantable quality. Thus, on delivery, on acceptance by the customer, the shipper computer sends confirmation of delivery to the customer accounts server and then the customer accounts server will send the information to the system services server to cause whatever is the agreed settlement procedure to be carried out.

Another major problem that the invention addresses is the question of taxation and in particular, taxation to a government body, when a remote trade in the sense of delivery from one country to another having separate jurisdictions and thus tax laws. This is becoming an increasingly difficult problem for governments, when trans-national trade occurs over the internet, it can be relatively difficult to gather and collect the required taxation, duty, value added tax, or whatever it may be. When this happens, as part of the trade, the merchant computer sends with the merchant transaction identifier, a product identification system sufficient to determine the tax. Ideally, the product identification will be an international tax reference code and ideally, it should be as part of the product identification. When this is done, then the taxation can be readily easily calculated and the amount of taxation due is added to the amount of the payment request as a consolidated payment request to the customer computer. Obviously, in this case, then the customer accounts server will, on sending the transaction acceptance message to the customer accounts server, send instructions to system services server to cause payment to the government body. The system ensures that correct payment is made to the merchant and the correct tax or other duty is correctly paid to the government.

The present invention also tackles the problem of discounts provided by merchants, whether they be by way of coupons or the like, which coupons may have a monetary value or some other form of redemption rules that allows a monetary value to be attached to it, such as, for example, four for the price of one, or similar schemes. What happens is that the merchant computer now takes an active role in the system and the merchant computer sends the coupon having a monetary value and redemption rules to the system services server and the system services server sends the coupons to the customer via the customer computer. Subsequently, the customer computer can send the coupon details to the customer accounts server, on sending a transaction acceptance message.

Then, depending on the way in which the system operates, the customer accounts server sends the coupon details to the merchant accounts server and the merchant accounts server accepts the coupon to be used at least in part payment of the transaction. For example, the merchant accounts server sends the coupon detail to the system services server and sends instructions to the system services server to cause payment to the merchant. The system services server may send the coupon directly to the customer computer or via the customer accounts server. Indeed, in many instances, the coupon will be customer specific and then the merchant computer will send, with the coupon, merchant transaction identifier numbers which will be used to identify the customer computers.

Many settlement procedures may be used, for example, one method may comprise setting up a merchant account and the merchant accounts server will then store the payment acceptance message as an account receivable due for payment in accordance with the agreed payment rules and would eventually download to the system services server, the accounts receivable requiring settlement so that the system services server will credit the merchant account with the payment due. This could be done at agreed time limits. The advantage of this is that relatively small sums of money could be accumulated and then credited to the merchant. A major proportion of the operation of the invention can be carried out in real time.

Further, the invention provides a trading system for carrying out a transaction between a merchant and a customer where the merchant sends the goods and services to the customer. The transaction is carried out over a communications network where the initiating party, namely the customer to the transaction contacts the merchant through the intermediary of a third party. Further, the customer can maintain anonymity, if required. Then, the system will require at least a system services server, a customer accounts server for connection to a customer computer, and a merchant accounts server for connection to a merchant computer. Then, the customer computer will have means for communicating its intention to purchase from the merchant computer and the other computers will have means for carrying out the various transactions as laid out above.

Further, the invention provides a trading system for carrying out the transaction between a merchant and a customer with the transaction being carried out over the communications network where the customer to the transaction contacts then merchant through the intermediary of a third party so it is possible to retain anonymity.

Further, the invention provides a computer program comprising program instructions for causing a computer to perform the method as laid out above, or which, when loaded into a computer, could constitute the processing means as described above. Such a computer program may be embodied on a record medium, a computer memory, a read-only memory or carried on an electrical signal carrier.

BRIEF DESCRIPTION OF THE DRAWINGS

The invention will be more clearly understood from the following description of some embodiments thereof, given by way of example only, with reference to the accompanying drawings, in which.

DETAILED DESCRIPTION OF THE PREFERRED EMBODIMENTS

In this specification, when using the term "jurisdiction remote from", it is to be appreciated that since this is an invention that can, for example, be carried out over the internet, in many instances, the receipt of a message or indeed the generation of a message may occur in a country or area not necessarily within the jurisdiction of any patent granted for this invention. Therefore, the claims and specification are to be read as taking account of this and in such cases where such actions take place, it is deemed that the message, on being received in the jurisdiction to which the patent applies, has the same effect in relation to this patent as if the message had actually been generated within the jurisdiction rather than generated outside the jurisdiction and then simply sent into the jurisdiction. To avoid an unnecessary multiplicity of claims and confusion, not all of these individual situations are specifically claimed, however, it is the intention that the claims of this patent specification should be so interpreted, namely, that all the steps according to the invention do not necessarily have to take place within the specific jurisdiction to which any patent granted relates.

Thus, in effect, certain actions may have to take place out of the jurisdiction as a condition precedent for initiation of certain of the actions within the jurisdiction.

For ease of understanding and to avoid confusion, various entities such as merchants or customers are often referred to as computers as the method of the invention will often be carried out solely by computers.

Figure 1:
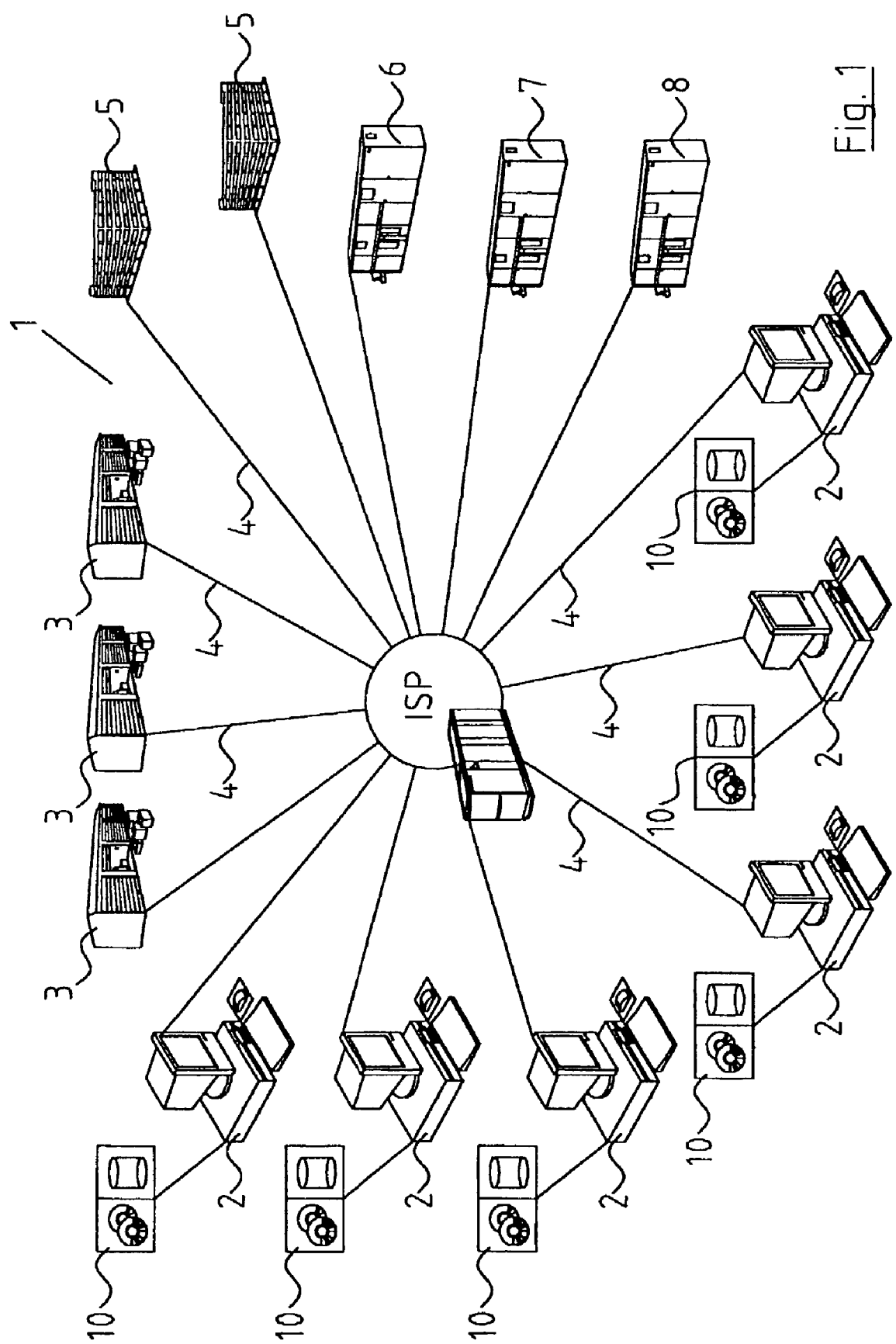
FIG. 1 is a diagrammatic layout of a trading system in which the method according to the present invention is used.

Referring to FIG. 1, there is illustrated a trading system, indicated generally by the reference numeral 1, comprising a plurality of customer computers 2 and merchant computers 3 all connected together over the Internet. Only the one internet service provider is shown, all of which are provided by a telecommunications network 4. Also, within the system, there may be a number of financial institutions such as banks 5, again connected to the telecommunications system. Further, there is provided a merchant accounts server 6 and a customer accounts server 7, together with a system services server 8. Only one merchant accounts server 6 and one customer accounts server 7 is shown. However, it will be appreciated that a number of merchants might be all connected to one merchant accounts server and another number of merchants connected to another merchant accounts server. Further, some of the customer's computers may be connected to one customer accounts server and others to another customer accounts server. All the accounts servers would normally be part of a bank or financial institution.

Each customer computer 2 has an associated customer account. Further, each customer computer 2 has downloaded thereon a customer control application 10. This customer control application 10 contains details of the customer account, which customer account is also stored in the customer accounts server 7. Each merchant has on the merchant accounts server 6, a merchant's account stored on that server. The merchant accounts server 6 and the customer account server 7 are separate servers. Although they may be provided on the one computer, they are maintained separately but could equally well be provided on different computers. The system services server 8 provides many of the control functions and also provides certain additional computer programs and services that could not be easily supplied by each of the customer control applications 10 or the customer computers 2. For example, the system services server 8 might include taxation and other duty computation software, a coupon or discount handling server and various other servers or service providers to the whole system. However, these are all generally described under the term "system services server". It will be appreciated that to a certain extent, this terminology is restrictive. However, it is used to facilitate the understanding of the invention without reciting a large number of servers. It will also be appreciated that many of the control functions may be carried out by other computers and servers of the system. Thus, for example, reciting that the trading system comprises a customer accounts server; a merchant accounts server; a system services server; merchant computers; customer computers; and a telecommunications network interconnecting the servers and the computers, each computer and server having a unique identifier for contact within the telecommunications network, is not to be considered restrictive in any way of the number and arrangement of computers and servers which may be used.

It will be appreciated that there are many ways of carrying out the invention and there are many checks and verifications that must be carried out, however, it is advantageous to consider the invention in its simplest form to identify how the invention would be carried out.

Figure 2:
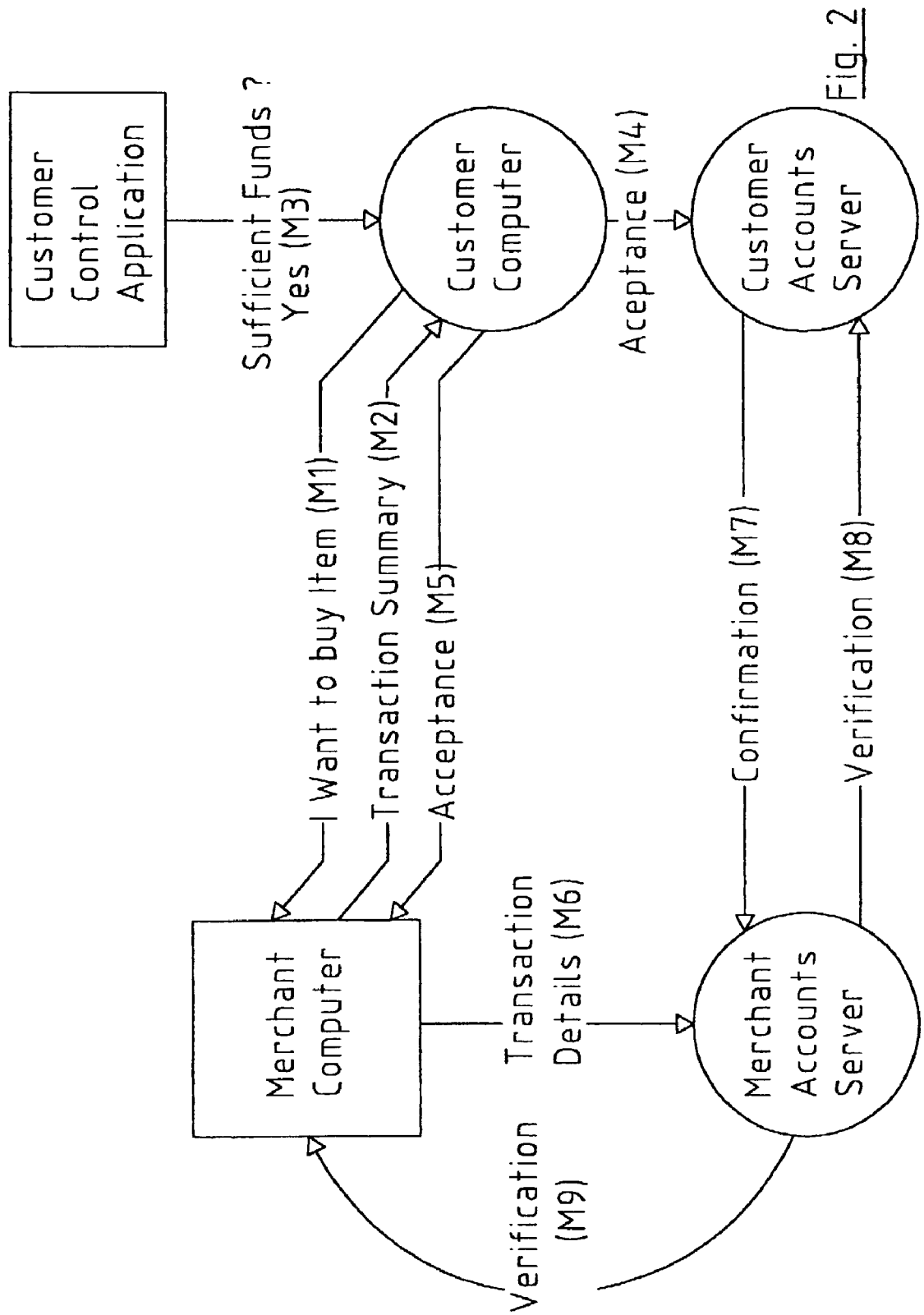
FIG. 2 is a diagrammatic representation of the trading system.

Referring to FIG. 2, there is illustrated some of the steps that are carried out, not necessarily all of them are carried out with each transaction, however, the steps are laid out and describe, in broad outline, the method according to the present invention.

It is presumed in the description that all the various trading steps have been carried out between the customer computer and the merchant computer, for example, the downloading of shopping baskets, enquiries, etc. from the merchant computer to and from the customer computer and that, at some stage during the operation, the merchant computer will either dispatch goods to the customer or will simply download the goods over the internet to the customer. Various methods for the downloading and sending of goods will be described hereinafter, however, at this stage, it is presumed that there is no difficulty whatsoever for the customer in having the goods either sent physically by the merchant to him or her, or simply to download it over the internet. Obviously, if downloaded over the internet, there is no identification of the customer who is anonymous.

Prior to carrying out the method, there is established on the customer computer, the customer control application which contains details of the customer account. This could be established in a myriad of ways. Simply, a customer could lodge with the system services server a sum of money, which sum of money would be lodged to the customer accounts server, which sum of money would then allow the customer control application to be established, the customer control application having the details of the customer account. Alternatively, the customer accounts server could simply have credit card details with details of a bank that would simply pay any sums of money up to a particular limit incurred by the customer. One could envisage a situation where customers might wish to establish directly, a credit account with the customer accounts server, that is to say, the operator of the system. However, all that is required is that the customer control application is effectively a customer account that has a sum of money in it that the customer can spend. With this customer control application established and the customer computer connected to the customer accounts server that also has the identical information, the customer computer can then trade over the internet with a merchant computer, once the merchant computer is connected to a merchant accounts server, which merchant accounts server is part of the system or is connected to be able to communicate with the customer accounts server.

Briefly, therefore, the transaction is carried out by the transmittal of a number of messages in real time between the various computers and servers.

Message No. 1 (M1)—Intention to Buy

In the first message, the customer computer, having already contacted and conducted a trade with the merchant, signifies to the merchant computer that the customer computer wishes to buy one or more items. Therefore, the customer computer transmits to the merchant computer this message M1 by, for example, clicking an icon.

Message No. 2 (M2)—Transaction and Payment Request

When the merchant computer receives message M1 from the customer computer, the merchant computer then downloads or sends a merchant transaction identifier number and payment request to the customer computer. The exact format of the merchant transaction identifier number can change but since merchants already have their own merchant transaction identifiers, this number will be used, together with the merchants own identifier of the type used with financial institutions, and also, ideally a product identifier, which product identifier number is one that is internationally recognised since, as will be explained hereinafter, the invention can be used for the computation of tax and duty payable. Obviously, in a multi-product sale, there will be more than one product identifier number. Therefore, ideally, the merchant computer, on receiving an order, uses the international tax reference code in the product identification. Essentially message M2 is the first transaction identifier.

Message No. 3 (M3)—Customer Control Application

When the customer computer obtains what is effectively an invoice comprising the transaction summary and the payment request, namely, message M2, from the merchant computer, the customer computer consults the customer control application to see are there enough funds or can the payment be made. If there are enough funds, then the customer computer continues with the operation.

Message No. 4 (M4) to Customer Accounts Server

In message number 4, the customer computer, having had the transaction cleared by the customer control application, sends the same information to the customer accounts server. Presuming that the customer accounts server accepts it, the transaction proceeds. One situation where the customer accounts server would not accept this transaction would be where the customer had, in some way, attempted to interfere with the information on the customer control application or where some fault in the system had occurred. However, in general terms, this message is only a check on the availability of funds and the fact that the customer accounts server will assume responsibility for the payment.

Message No. 5 (M5)—Acceptance to Merchant

In message M5 which is essentially optional, the customer computer informs the merchant computer that the transaction has been accepted and thus the merchant computer now has an acceptance of the transaction.

Message No. 6 (M6) to Merchant Accounts Server

The merchant computer then downloads to the merchant accounts server, the transaction details, that is to say, the information that was sent in message M2 to the customer computer. These are then delivered, in message M6, to the merchant accounts server, where the merchant accounts server will store the details.

Message No. 7 (M7) to Merchant Accounts Server

The customer accounts server, having accepted the fact that the account will be paid, sends confirmation to the merchant accounts server which is effectively a payment acceptance message including the transaction acceptance message. The merchant accounts server now has confirmation that the customer accounts server is accepting the payment.

Message No. 8 (M8)—Verification to Customer Accounts Server

In message M8, the merchant accounts server confirms to the customer accounts server that it has received confirmation of the payment and that the transaction has been accepted.

Message No. 9 (M9)—Verification to Merchant

The merchant accounts server can also send verification to the merchant computer that everything is in order and that the payment will be made and that the merchant can dispatch the goods.

It will be appreciated that in many cases the messages will be carried out simply by the click of a button, or some other simple means.

It will be appreciated that this is a relatively simplistic way of looking at the invention and that, for example, the merchant computer may not necessarily need verification, i.e. message M9, that the merchant accounts server has received confirmation because there can be a system in place whereby, if the merchant computer does not receive confirmation or verification within a certain period of time, a query can be raised. Similarly, the fact that the customer accounts server has sent confirmation message M7 to the merchant accounts server does not necessarily have to be verified and confirmed by the merchant accounts server in message M8. Obviously, various checks will be carried out by the merchant accounts server such as, for example, comparing the confirmation message from the customer accounts server with the transaction details downloaded by the merchant computer.

Essentially, as each transaction is carried out, the merchant accounts server will store the details.

It will be appreciated, for example, that the merchant accounts server will be linked to the system services server which will have an account established for the merchant. Then, the merchant accounts server will send items for payment to the system services server, which items will have already been approved by the customer accounts server and therefore will be credited by the system services server to the merchants account.

At various stages, the merchant can download the payments as desired.

Figure 3:
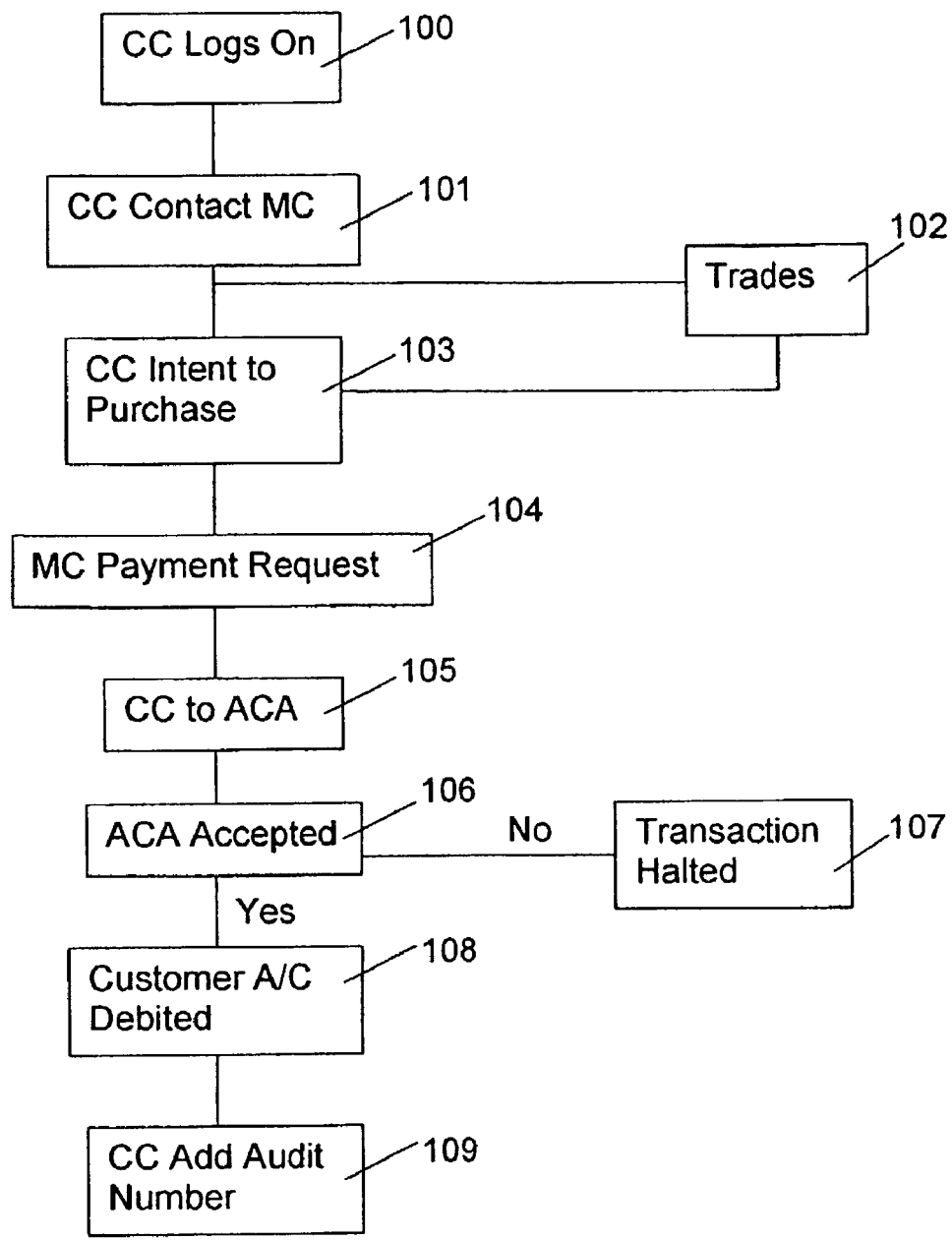
FIGS. 3 to 8 are flowcharts of the major features of the invention.
Figure 4:
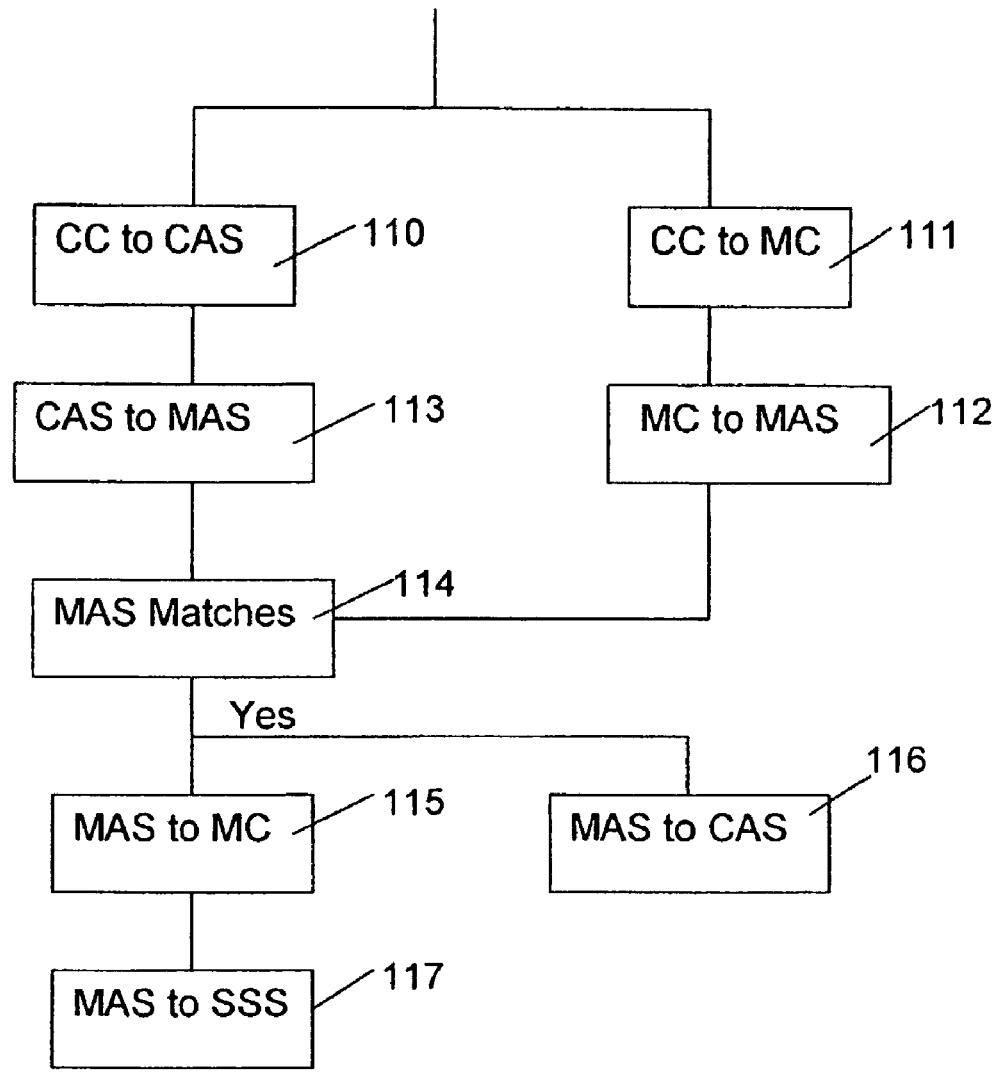

Referring now to FIGS. 3 and 4, there is illustrated a somewhat more detailed operation of the method according to the invention. In step 100, the customer computer logs onto the system. This will be done in the usual way through the internet which will then allow the customer computer, in step 101, to contact the merchant computer. In step 102, which may take many steps and to and fros between the merchant computer and the customer computer, the customer computer will conduct negotiations with the merchant computer. At no stage, will the customer, during this communication, be identified to the merchant. They will merely be connected through the Internet. Thus, for example, a rogue merchant will not gather any information that will permit a fraud to be committed either then or in the future, nor indeed can the hacking of a merchant site result in any information being accessed that will allow fraud to be committed on the customer.

In step 103, the customer computer indicates to the merchant computer the intent to purchase. In step 104, the merchant computer will send down a merchant transaction number and payment request. Usually, it will include the same merchant identifier number that is normally sent, for example, to an acquirer bank or the like, which very often is not normally sent to a customer. This will be sent with the product identifier number. The product identifier number will ideally be, as mentioned already, in accordance with some internationally known code. In addition, the merchant computer will send the actual item identifier for the customer computer. In other words, one composite message will contain all this information. Also, with that will be the actual amount required for payment, namely, the payment request. In step 105, the customer computer will access the account control application on which is sitting the customer's balance. As has been explained already, the customer's balance can be anything from an unlimited balance, for example, if a customer's account was backed by American Express, to an actual fixed sum of money, or to some other credit limit. Then in step 106, the account control application considers the request. In other words, it carries out suitable checks such as comparing it with the credit limit and then either, in step 107, rejects the transaction in which case the customer computer cannot continue with the transaction, or alternatively, it accepts the transaction and then in step 108, the customer account is debited. In step 109, the customer computer adds an audit number to the number previously downloaded by the merchant computer. This audit number can be used by the customer computer and the customer accounts server to keep an exact control and audit trail on the customer's account. It will be appreciated that the present system is directed particularly to this accountancy and control function. The audit number is not essential but can be quite useful. Indeed in most systems an audit number will be used. The audit number would simply be the next sequential number and does not have to be, in any way, a secret number.

In step 110, the customer computer sends to the customer accounts server, the same information. This is a security procedure such that if the customer computer had in some way altered the account control application to make the account control application accept a transaction, the customer accounts server would immediately spot the problem and would abort the transaction. Ideally, with the message from the customer computer to the customer accounts server, there is an identification code used. The identification code used may be any suitable algorithm, PIN number or anything that is required. One great advantage of such an algorithm or transaction key is that an outsider looking into the transaction does not have enough information to replicate another valid transaction, in other words, defraud the system.

In step 111, the customer computer sends acceptance to the merchant computer and the merchant computer who, in step 112, sends the transaction to the merchant accounts server. In step 113, the customer accounts server, having validated the transaction, sends confirmation to the merchant accounts server. In step 114, the merchant accounts server compares the information received from the merchant computer with the information received from the customer accounts server and, presuming they both match, then in step 115, the merchant accounts server sends confirmation of the matching to the merchant computer and in step 116, sends confirmation to the customer accounts server. In step 117, the merchant accounts server sends a payment request to the system services server. Steps 115 and 116 are optional. How the merchant gets paid again is a question entirely relating to how the system is set up and does not impinge on the operation of this invention.

It will be appreciated that since all the communication that could identify the customer has taken place between the customer computer and the customer accounts server and the merchant accounts server does not receive any identification of the customer from the customer accounts server, anonymity is maintained.

Figure 5:
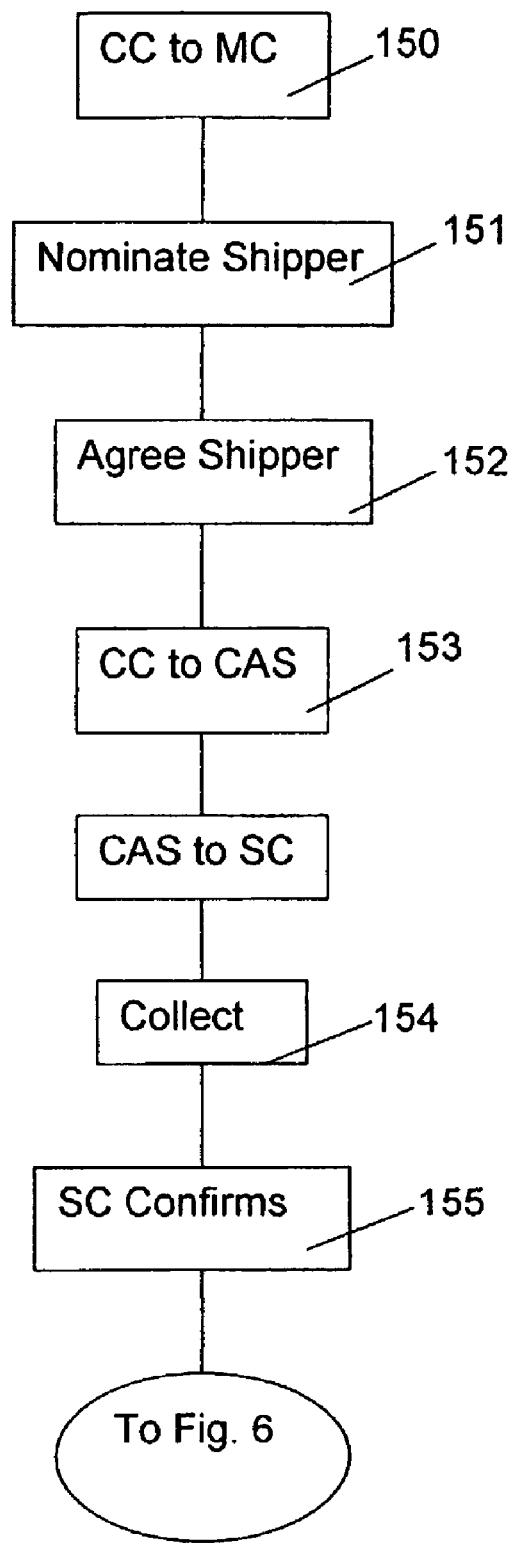
Figure 6:
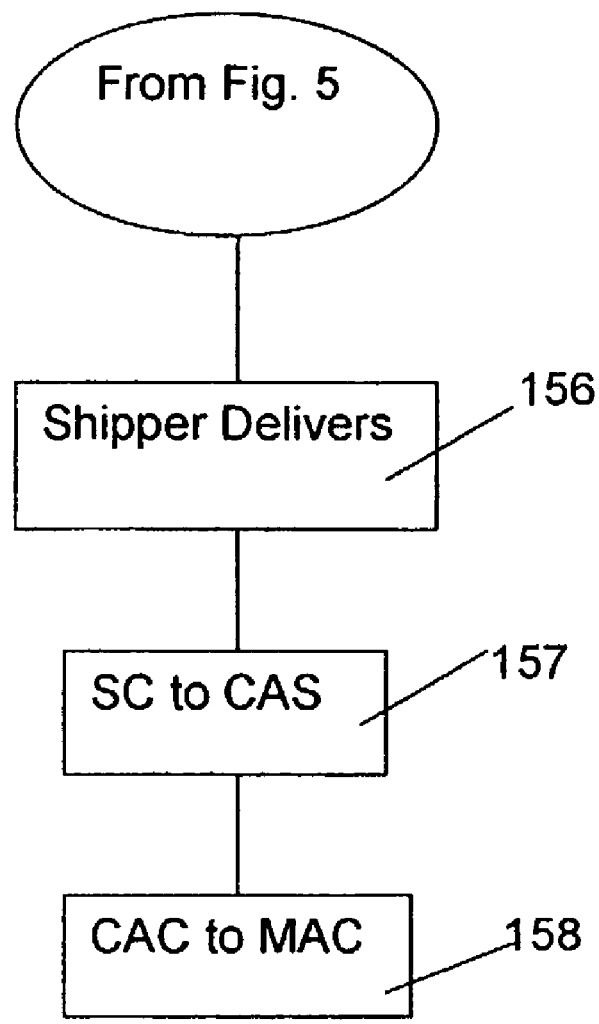

Referring now to FIGS. 5 and 6, there are two situations that need to be addressed in the method according to the present invention. The first situation is where the merchant has to deliver goods physically to the customer, rather than simply download from the internet such as, for example, the provision of some service such as a betting service or the downloading of music, films and the like. The customer, at the same time, may not wish to divulge his or her address or name to the merchant as he or she may still require anonymity. Thus, when the transaction requires the specific delivery of goods to the customer by way of a package and the customer wishes to be anonymous by not sending the merchant computer precise delivery details, including the name and address, then the customer computer has to, in step 150, inform the merchant computer that the customer requires anonymity and is not prepared to divulge his or her name and address to the merchant computer.

In step 151, the merchant computer or the customer computer nominates to the other party one or more preferred shippers. In step 152, discussions take place between the two parties until a shipper can be appointed. However, generally speaking, this will not cause any problems in that either the merchant will have shippers that are agreeable to the customer or alternatively, the customer will have shippers that are agreeable to the merchant. Having chosen a nominated shipper, then in step 153, the customer computer gives sufficient information to the shipper computer through the customer accounts server to enable the shipper to collect the package from the merchant. This information may or may not include full shipping details. This is discussed below. Then in step 154, the shipper computer records acceptance of the package from the merchant with sufficient information being supplied by the merchant to allow the shipper identify the package and match the delivery instructions received from the merchant with those received from the customer accounts server. This information could be the merchant transaction identifier.

In step 155, the shipper computer confirms to the customer accounts server that the package has been collected. In step 156, the shipper delivers the package to the customer. In step 157, the shipper computer confirms to the customer accounts server that the package has been delivered and in step 158, the customer accounts server confirms the delivery of the package to the merchant accounts server.

Depending on whether the customer has stipulated that accounts cannot be paid unless proof of delivery has been given, steps 157 and 158 may not be necessary. For example, depending on the payment terms and conditions that the system controllers have agreed with the merchant, the merchant may indeed have already been paid in the sense that the merchant accounts server may have already been informed that it can institute the normal payment procedures. If, however, proof of delivery is required, then it is essential that the shipper computer confirms to the customer accounts server, delivery of the package, and then the customer accounts server must confirm to the merchant accounts server that the agreed payment procedure may be initiated. Indeed, it will be appreciated that additional steps may be required such as, for example, on receiving confirmation of delivery by the shipper, the customer accounts server may have to contact the customer computer to ascertain as to whether the customer computer has indeed accepted delivery or whether there is any problem in relation to the delivery.

In accordance with the invention, it is envisaged that trading over the internet will require the reporting of such transactions in many jurisdictions to allow tax and other duties to be computed. Needless to say, whether or not the merchant and customer are located in the one jurisdiction, then the local taxation authorities may require, for example, the computation of the payment of a sales tax or some other form of tax such as value added tax (VAT). Similarly, when the particular transaction is taking place in two different jurisdictions in the sense that the merchant is in one jurisdiction and is selling into the other jurisdiction, then there may be, particularly in the case of the physical delivery of goods, the imposition of an import or other duty. Obviously, authorities have to, in some way, obtain payment of the taxation and further, for the customer, the customer must be aware of the imposition of such taxation and the amount before engaging in the particular transaction because while superficially, a price quoted by a merchant might appear to be less than the price quoted by another merchant, the final amount due by the customer might exceed the amount quoted or payable to a locally based merchant.

Therefore, many situations, which will be largely dictated by the location of the customer computer rather than the merchant computer can arise and many duties and taxes may have to be calculated.

Figure 7:
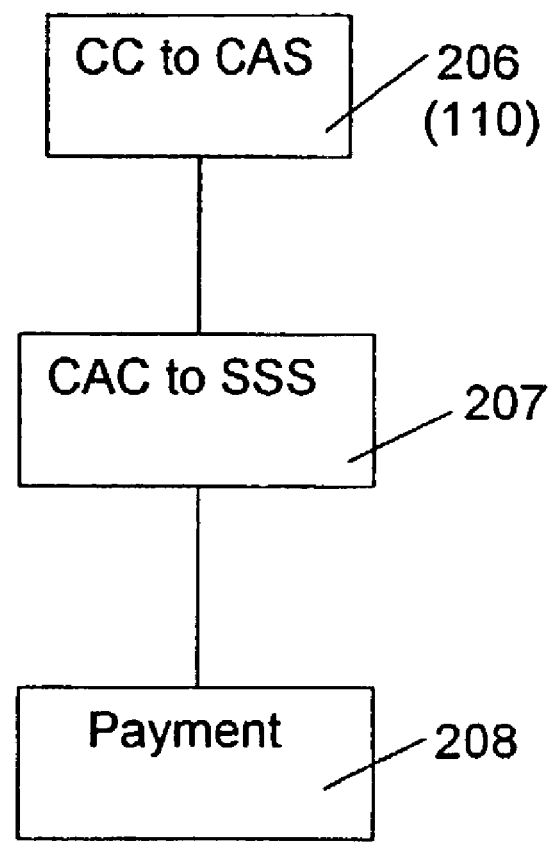
Figure 8:
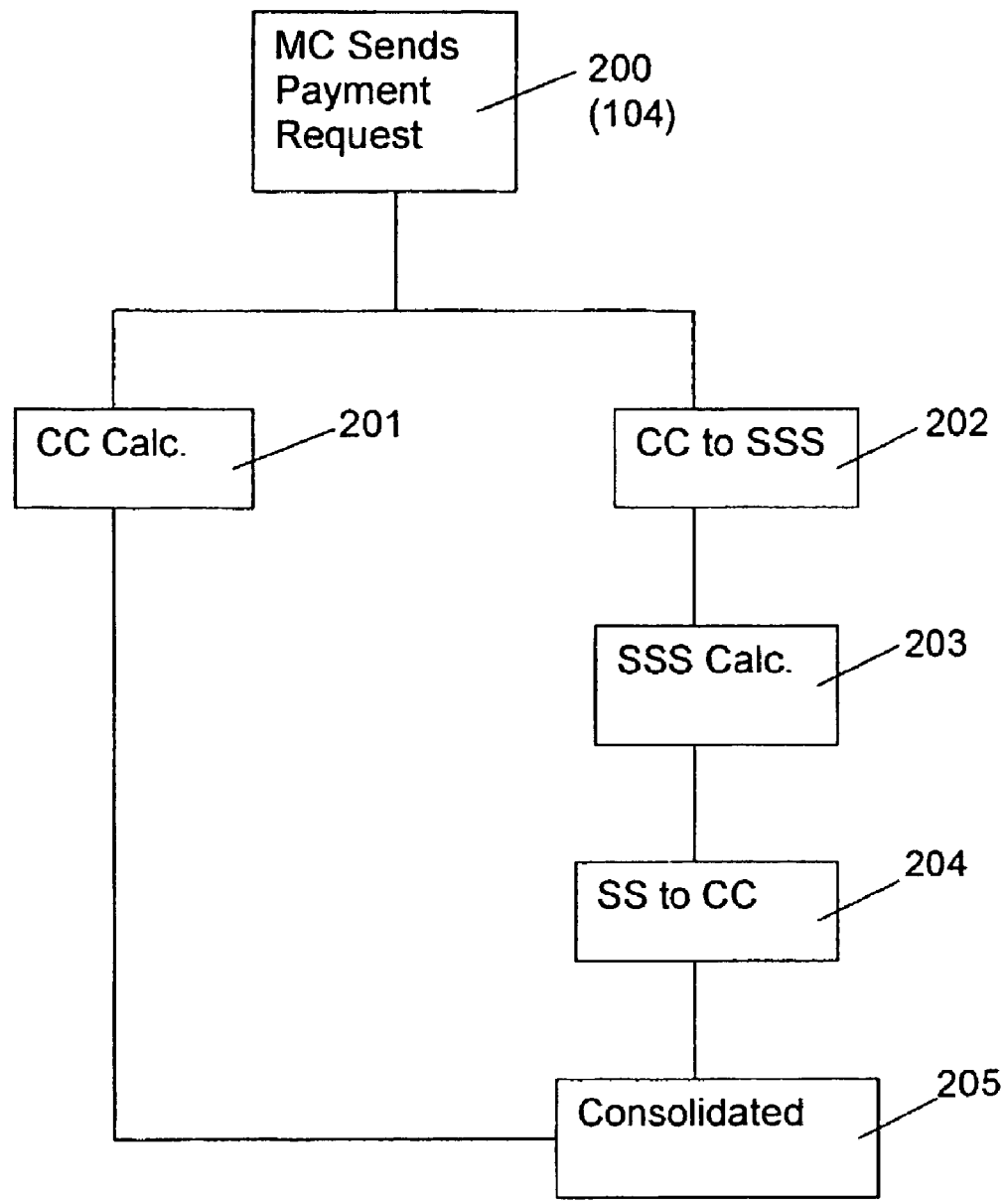

Referring now to FIGS. 7 and 8, there is shown how, in accordance with the invention, tax and duty computation may be performed. In step 200, the merchant computer sends the payment request to the customer computer. This is identical to step 104 as previously described in FIG. 3.

Then, either in step 201, the customer computer calculates the tax and duty due or in step 202, the customer computer sends the payment request to the system services server for computation of the taxation. In step 203, the system services server computes the taxation and in step 204, the system services server sends the tax computation to the customer computer. Then, irrespective of whether the customer computer or the system services server has calculated the tax, the customer computer adds the tax or duty due to the amount stated in the payment request received from the merchant computer and then computes what is in effect a consolidated payment request and then the consolidated payment request is used in the same manner as if it had originally been furnished by the merchant computer with the original payment request.

In step 206, which is the same step as step 110 of FIG. 4, the customer computer sends the payment request, in this case the consolidated payment request, to the customer accounts server. The customer accounts server, in step 207, sends the payment details in relation to the taxation or duty due to the system services server.

Then in step 208, the system services server pays the taxation or duty due.

It will be appreciated that the actual manner in which this is carried out will be dependent on the rules imposed by the relevant tax authorities. It will also be appreciated that the consolidated payment will be dealt with in the same manner as if it was a payment without any taxation.

Various other messages may be given and sent between the parties, for example, on completion of a transaction, the merchant computer may send a message to the customer computer or to the customer accounts server confirming that the transaction has been completed and, for example, the necessary payment received. Equally well, this could be sent to the customer by, for example, the merchant or the customer accounts server. A multiplicity of messages can be sent without any great difficulty between the parties.

What needs to be appreciated in relation to the present invention is that many other security and other steps may be performed. However, in essence, the invention is a relatively simple system of tracking and recording the payments due in respect of internet type transactions where the customer is located remotely from the merchant and further, the nature of the transaction is not such that at least initially the customer's details such as name and address are revealed to the merchant. In effect, the customer accounts server acts as an intermediary between the customer and the merchant. It will be appreciated that the merchant also needs to sign up to the system in the sense that the merchant has to be connected to a merchant accounts server, which merchant accounts server can communicate with the customer accounts server. Thus, in some instances, many of the customer computers will be connected to one customer accounts server, other customer computers will be connected to different customer accounts servers and similarly, merchant computers will be connected to various merchant accounts servers. However, for the merchant, there will be the one merchant accounts server, which merchant accounts server will handle all the transactions, and the merchant accounts server will act in conjunction with the system services server, which may be in fact in the same organisation as both the merchant accounts server and the customer accounts server or equally well may be a totally unrelated server, to receive the funds due to the merchant for the various transactions. Thus, with the merchant accounts server, there will be associated an account which will be run by the system services server. Thus that account may receive funds from various customer accounts servers. However, almost certainly, central settlement will be provided. When there is established a merchant account in the system services server, the system services server and the merchant will reach some agreement as to the manner in which the account is to be drawn down. It may, for example, be drawn down by the merchant having a direct transfer of funds to a merchant's own separate bank account on a daily basis, or alternatively, the merchant may use the account established by the system services server as a bank account.

Similarly, with the customer accounts server and the account established by the customer accounts server for each customer, it can be operated in many ways. For example, it can be by way of a simple lodgement of funds on a totally anonymous basis or at least sufficiently anonymous to satisfy any disclosure regulations by the relevant government authorities of the country in which the customer computer is located. The customer account associated with the customer computer, as well as being an account that is directly linked to the customer accounts server, could be, for example, a simple debiting procedure with a credit limit set by a credit card company. Thus, with the customer account, there could be associated a credit card number and if the system services server was the issuer of such a credit card, then the account would be operated in the same way as any other credit card account. Alternatively, it could be a direct debit system or the like from a customer's account. Effectively, therefore, there are no constraints on the manner in which the customer account can be set up.

In relation to the settlement of the account and in relation to such matters as the calculation of tax, almost certainly, the system services server would not be the one server but would comprise a number of service servers such as, for example, a tax computation server, an account settlement server, and so on.

It will also be appreciated that many of the steps laid out above are not always necessary to carry out the invention and that in certain other circumstances, additional steps may be carried out. One of the main advantages for the customer is that since all valid transactions are effectively on the customer's computer as soon as executed, a strict control on expenditure and expenses can be maintained. Also, depending on the manner in which the account is being set up, the customer can have considerable security. For example, if a customer sets up an account in conjunction with the customer accounts server, which account has a definite total expenditure limit that the customer tops up from time to time, then the customer can ensure that even if the security were to be breached, the customer is prevented from being a victim of fraud beyond the limit of the customer account.

One of the major features of the present invention is the fact that the customer computer can add a customer audit identifier to each transaction.

For the system services server, if the system services server agrees settlement terms with the merchant such as, for example, 30 days beyond the end of the month in which the transaction took place, then the operator of the system will, in effect, have the use of the customers money for the period since the customer will have been debited with the funds immediately the transaction has been agreed but the merchant will not be paid immediately. Particularly for small transactions, the merchant, having his account operated by the merchant accounts server, ensures that the merchant has an absolute guarantee that payment will be made. It thus becomes a viable proposition for all three of the parties to engage in transactions over the internet, particularly those transactions of low monetary value. As regards the financial institution, the cost of servicing the payments are greatly reduced in the present invention.

The system services server may or may not be a financial institution and in many instances, may not be but may be a separate operation supplying services to the financial institution.

It will also be appreciated that the system according to the present invention addresses one of the principal concerns of governments, namely, that the provision of services and goods, particularly those that do not require the transmission of a package through postal or other shipping means from the merchant to the customer, is wide open to the avoidance and evasion of duty and taxes. At the present moment, it is virtually impossible for a government for example, to prevent establishments to engage, for example, in wagering and betting from an operation offshore, as it were, in relation to the particular country where they are effectively based, in the sense that they are servicing customers or clients in that particular jurisdiction.

Such companies are able to evade, or more properly avoid in a perfectly legal way, the imposition of duties imposed on them if they were to carry out the particular betting operation physically within the jurisdiction. This has obviously considerable implications for many authorities, not just simply in relation to loss of revenue, but in relation to indigenous employment. Almost certainly governments are going to have to regulate this situation by way of mutual agreement, almost certainly under a GATT or the like World Trade Agreement supervised by, for example, the World Trade Organisation (WTO). Once authorities decide that such trade has to be regulated and that the governments of the countries in which the customer is located have to cooperate to ensure that all legitimate taxation is paid, then almost certainly the systems according to the present invention become all the more important.

As explained already many types of computer may be used, not just simply a desktop computer, or portable computer but can be any suitable arrangement. However, it is envisaged that one of the ways in which the invention will often be carried out will be by way of mobile phone. However, when there is a mobile phone used to carry out the invention then effectively the mobile phone will only be a router of the information and will not necessarily be able to carry out all the computations. Thus, many of the computations will be either stored on a computer in the possession of the customer, or alternatively may be stored on a separate computer operated by the system services server, or more likely by the customer accounts server.

A classic example in which the invention could be carried out using a mobile phone could be for example in what is effectively customer present trading, in, for example, a supermarket. Presuming that a mobile phone were to be used, the mobile phone would establish communication with, for example, a checkout computer such as, for example, by way of an infrared link or simply by phoning the particular checkout. Needless to say then the check-out or till, or checkout computer would operate with respect to the mobile phone in exactly the same way as if the mobile phone were the customer computer. However, effectively the mobile phone acts as a router, but can be easily programmed to display the necessary transaction details on the phone. Any other short message may also be so displayed. It will be readily appreciated how a mobile phone can be thus adapted to be used in connection with the present invention. The mobile phone would also be fairly useful for example, where a customer wishes to carry out purchases or payment of bills and the like when the customer is not necessarily based or located where his or her computer is, or even more generally where the customer does not in fact have a computer with sufficient functionality to carry out all the methods according to the present invention. It will also be useful for what could be card present transactions where the customer requires anonymity.

In essence the invention provides means for agreeing a transaction between a merchant and a customer, coding said agreed transaction, the customer and merchant each approving the coded transaction with their local accounts servers, and the local accounts servers effecting the transaction. The merchant need not know the identity of the purchaser. Only transactions involving delivery of goods require the purchaser to disclose his or her identity to at least a shipper. Since shippers can be made part of the operation there will not necessarily be any problem in relation to shippers. Since in many instances, the customer will be paying for the shipping directly, it will be in a shipper's interests to effectively establish the shipper computer as if the shipper computer were a merchant computer and therefore have an associated shipper account server and a shipper account. As described above, it will be relatively easy to appreciate how a shipper can protect the identity of the customer. It will be relatively easy for a merchant for example to entrust goods to a shipper with sufficient information to allow the shipper match the goods with the customer. Alternatively it will be easy for a customer computer through the customer accounts server to send to the shipper computer sufficient details to allow the shipper computer accept the package on the customer's behalf without the shipper computer disclosing to the merchant the customer's name and address.

In another embodiment the identity could be protected via a coded transaction to a trusted third party carrier. For example, FedEx could provide such a service.

At present, access to the Internet is controlled by Internet Service Providers, Web farms or direct access hereinafter all referred to as Internet Service Providers (ISP) who control the gateways to the internet. Today, any user or customer that wishes to access the Internet must do so through an ISP.

It will be appreciated that the customer control application can be implemented in a simple software program such as a C++ program or any other program. It does not matter where the customer control application is stored but preferably it will be stored on the customer computer as well as on the customer accounts server. The customer control application will have the customer's financial details so it will therefore have to be stored in a somewhat secure manner on the customer PC. It is envisaged that the customer will have access to the customer control application by entering a user password or the like.

It will be further appreciated that the total transaction may be carried out in real time unless some proof of delivery or other system is required, but essentially in most of the transactions, particular those where the goods or services are downloaded over the Internet all of the transactions can be carried out in real time with consequent security for the merchant.

It will be further appreciated that the customer may have means to interrogate his transactions and, if required, instigate discussions with the merchant via the control application without recourse to the third parties. This facility will greatly reduce disputed transactions and the associated cost of the resolution of them.

Effectively, the merchants account will be held by the system services server in a separate system services server account. Sums of money due to the merchant will be credited to that account by the system services sever and that money will then be transferred to the merchant in accordance with agreed procedures between the merchant and the system services server.

All the information which is generated to produce the various messages does not necessarily have to be transferred between all the parties all the time. For example, the information that the customer account requires for audit purposes will not necessarily be stored other than on the customer computer and the customer accounts server.

It will be appreciated that all the communication over the network can be carried out in encrypted form.

It will be further appreciated that the settling means may take place outside of the Internet. For example, the settling means may be carried out by a third party in a private network.

It will be appreciated that various aspects of the invention may be embodied on the computer that is running a program or program segments originating from a computer readable or usable medium, such medium including but not limited to magnetic storage media (e.g. ROMs, floppy disks, hard disks, etc.), optically readable media (e.g. CDROMs, DVDs, etc.) and carrier waves (e.g., transmissions over the Internet). A functional program, code and code segments, used to implement the present invention can be derived by a skilled computer programmer from the description of the invention contained herein.

In this specification, the terms "comprise", "comprises", "comprised" and "comprising" and any variant thereof and the terms "include", "includes", "included" and "including", or any variant thereof are considered to be totally interchangeable and should be afforded the widest possible interpretation.

The invention is not limited to the embodiments hereinbefore described but may be varied in both construction and detail within the scope of the claims.

The invention claimed is:

1. A method of conducting a transaction in a trading system, where a merchant sends any of goods and services to a customer, using a customer accounts server; a merchant accounts server; a system services server; a merchant computer having an associated merchant account; a customer computer having an associated customer account; and a telecommunications network interconnecting the customer accounts server, the merchant accounts server, the system services server, the merchant computer, and the customer computer, each having a unique identifier for contact within the telecommunications network, the method comprising the steps of:

the customer computer opening communications with the merchant computer, the customer computer communicating its intention to purchase from the merchant computer, the customer computer not requiring installation of any new software to communicate its intention to purchase from the merchant computer, the customer computer not revealing any information usable to secure customer payment to the merchant computer;

the merchant computer sending a merchant transaction identifier number and payment request to the customer computer;

the customer computer initiating contact with the customer accounts server and sending to the customer accounts server a customer transaction acceptance message which includes the merchant transaction identifier number and the payment request;

the merchant computer initiating contact with the merchant accounts server and sending to the merchant accounts server a merchant transaction acceptance message including the merchant transaction identifier number and the payment request;

the customer accounts server initiating contact with the merchant accounts server and sending to the merchant accounts server a payment acceptance message including the merchant transaction identifier number and the payment request;

the merchant accounts server matching the merchant transaction acceptance message received from the merchant computer and the payment acceptance message received from the customer accounts server, and the merchant accounts server sending instructions to the system services server to cause payment to the merchant in accordance with an agreed settlement procedure having agreed payment rules.

2. A method of conducting a transaction in a trading system, where a merchant sends any of goods and services to a customer, using a customer accounts server; a merchant accounts server; a system services server; a merchant computer having an associated merchant account; a customer computer having an associated customer account and a telecommunications network interconnecting the customer accounts server, the merchant accounts server, the system services server, the merchant computer, and the customer computer, each having a unique identifier for contact within the telecommunications network, the method comprising the steps of:

the customer computer opening communications with the merchant computer;

the customer computer communicating its intention to purchase from the merchant computer, the customer computer not requiring installation of any new software to communicate its intention to purchase from the merchant computer, the customer computer not revealing any information usable to secure customer payment to the merchant computer;

the merchant computer sending a merchant transaction identifier number and payment request to the customer computer;

the customer computer initiating contact with the customer accounts server and sending to the customer accounts server a customer transaction acceptance message which includes the merchant transaction identifier number and the payment request;

the customer computer accepting the transaction by sending an acknowledgment message to the merchant computer;

the merchant computer initiating contact with the merchant accounts server and sending to the merchant accounts server a merchant transaction acceptance message including the merchant transaction identifier number and the payment request;

the customer accounts server initiating contact with the merchant accounts server and sending to the merchant accounts server a payment acceptance message including the merchant transaction identifier number and the payment request;

the merchant accounts server matching the merchant transaction acceptance message received from the merchant computer and the payment acceptance message received from the customer accounts server; and the merchant accounts server sending instructions to the system services server to cause payment to the merchant in accordance with an agreed settlement procedure having agreed payment rules.

3. The method of claim 2 in which when sending the acknowledgement message the customer computer adds a customer audit identifier.

4. The method of claim 2 in which the merchant accounts server sends matching confirmation of the merchant transaction acceptance message and the payment acceptance message to the merchant computer and to the customer accounts server.

5. The method of claim 2 further comprising the steps of:
preparing the customer account including payment credit limit rules for the customer;
storing the customer account as an account control application in the customer accounts server;
downloading the account control application to the customer computer;
storing the account control application on the customer computer; and
subsequently on receiving the merchant transaction identifier number and the payment request from the merchant computer, the customer computer sending the payment request to the account control application and only if the payment request is within the payment credit limit rules does the customer computer carry out the step of accepting the transaction and the customer account is debited.

6. The method of claim 2 in which, on the merchant computer sending the merchant transaction identifier number and the payment request to the customer computer, the merchant computer sends product and billing information as a product identifier, being part of the merchant transaction identifier number, to the customer computer.

7. A trading system for carrying out a transaction between a merchant and a customer over a communications network, the system comprising:
a system services server;
a customer accounts server for connection to a customer computer; and
a merchant accounts server for connection to a merchant computer,
the merchant accounts server being configurable to receive a merchant transaction acceptance initiated by the merchant computer that includes a merchant transaction identifier number and a payment request;
the customer accounts server being configurable to receive a customer transaction acceptance initiated by the customer computer that includes the merchant transaction identifier number and the payment request, the merchant transaction identifier number and the payment request having been received by the customer computer from the merchant computer upon the customer computer communicating an intent to purchase from the merchant computer, the customer computer not requiring installation of any new software to communicate its intention to purchase from the merchant computer, the customer computer not revealing any information usable to secure customer payment to the merchant computer; and
the system services server being configurable to initiate payment to the merchant on behalf of the customer upon the merchant transaction acceptance matching the customer transaction acceptance.

8. A method of conducting a transaction in a trading system, where a merchant sends any of goods and services to a customer, using a customer accounts server; a merchant accounts server; a system services server; a merchant computer having an associated merchant account; a customer computer having an associated customer account; and a telecommunications network interconnecting the customer accounts server, the merchant accounts server, the system services server, the merchant computer, and the customer computer, each having a unique identifier for contact within the telecommunications network, the method comprising the steps of:
the customer computer opening communications with the merchant computer,
the customer computer communicating its intention to purchase from the merchant computer;
the merchant computer sending a merchant transaction identifier number and payment request to the customer computer;
the customer computer initiating contact with the customer accounts server and sending to the customer accounts server a customer transaction acceptance message which includes the merchant transaction identifier number and the payment request;
the merchant computer initiating contact with the merchant accounts server and sending to the merchant accounts server a merchant transaction acceptance message including the merchant transaction identifier number and the payment request;
the customer accounts server initiating contact with the merchant accounts server and sending to the merchant accounts server a payment acceptance message including the merchant transaction identifier number and the payment request;

the merchant accounts server matching the merchant transaction acceptance message received from the merchant computer and the payment acceptance message received from the customer accounts server, and the merchant accounts server sending instructions to the system services server to cause payment to the merchant in accordance with an agreed settlement procedure having agreed payment rules.

9. The method of claim 8 in which the customer computer accepts the transaction identifier number and the payment request from the merchant computer by sending an acknowledgement message that includes a customer audit identifier to the merchant computer.

10. The method of claim 9 in which the merchant accounts server sends matching confirmation of the merchant transaction acceptance message and the payment acceptance message to the merchant computer and to the customer accounts server.

11. The method of claim 10 in which, prior to the customer accounts server sending the payment acceptance message, the customer accounts server causes the customer account to be debited.

12. The method of claim 10 further comprising the steps of:
preparing the customer account including payment credit limit rules for the customer;
storing the customer account as an account control application in the customer accounts server; and
downloading the account control application to the customer computer and storing the account control application on the customer computer.

13. The method of claim 10 in which, on the merchant computer sending the merchant transaction identifier number and payment request to the customer computer, the merchant computer sends product and billing information as a product identifier with the merchant transaction identifier number and payment request to the customer computer.

14. The method of claim 10 in which, when the transaction requires physical delivery of goods to the customer by way of a package entrusted to an agreed shipper having a shipper computer connected to the telecommunications network, the steps are further performed of:
the customer accounts server, on sending the payment acceptance message to the merchant accounts server stipulating that payment is subject to proof of delivery as a payment rule;
on delivery, the shipper computer sending confirmation of delivery to the customer accounts server; and
the customer accounts server sending the confirmation of delivery to the system services server to cause the agreed settlement procedure to be updated.

15. The method of claim 10 in which when the transaction requires the customer to pay an additional sum by way of taxation to a government body, the steps are further performed of:
the merchant computer sending with the merchant transaction identifier number and the payment request, product identification;
calculating a tax amount due from the product identification and the payment request;
adding the tax amount due to the payment request as a consolidated payment request; and
on sending of the customer transaction acceptance message to the customer accounts server, the customer accounts server sending instructions to the system services server to cause payment of the tax amount due to the government body.

16. The method of claim 10 in which when the transaction requires the customer to pay an additional sum by way of taxation to a government body, the steps are further performed of:
the merchant computer sending to the customer computer with the merchant transaction identifier number and the payment request, product identification;
the customer computer sending to the system services server the payment request and the product identification;
the system services server calculating a tax amount due from the product identification and the payment request; and
the system services server sending the tax amount due to the customer computer to form a consolidated payment request; and
on sending of the customer transaction acceptance message to the customer accounts server, the customer accounts server sending instructions to the system services server to cause payment of the tax amount due to the government body.

17. The method of claim 10, further comprising the steps of:
the merchant computer opening communications with the system services server;
the merchant computer sending a coupon having a monetary value and redemption rules to the system services server;
the system services server sending the coupon to the customer computer;
the customer computer sending the coupon to the customer accounts server on sending the transaction acceptance message;
the customer accounts server sending the coupon to the merchant accounts server;
the merchant accounts server accepting the coupon to be used as at least part payment; and
the merchant accounts server sending the coupon to the system services server on sending instructions to the system services server to cause payment to the merchant.

18. The method of claim 10, further comprising the steps of:
the merchant computer opening communications with the system services server;
the merchant computer sending a customer specific coupon having a monetary value and redemption rules to the system services server, together with a merchant transaction identifier number used to identify the customer computer to whom the customer specific coupon is to be sent;
the system services server sending the customer specific coupon to the customer computer;
the customer computer sending the customer specific coupon to the customer accounts server on sending the transaction acceptance message;
the customer accounts server sending the customer specific coupon to the merchant accounts server;
the merchant accounts server accepting the customer specific coupon to be used as at least part payment; and
the merchant accounts server sending the customer specific coupon to the system services server on sending instructions to the system services server to cause payment to the merchant.

19. The method of claim 8 in which the settlement procedure comprises the steps of:
the system services server setting up a merchant account;

the merchant accounts server storing the payment acceptance message as an account receivable due for payment in accordance with the agreed payment rules;

the merchant accounts server sending to the system services server the accounts receivable requiring settlement; and the system services server crediting the merchant account with the payment due.

20. The method of claim 8 in which the merchant accounts server sends confirmation of matching the payment acceptance message and the merchant transaction acceptance message to the customer accounts server.

21. The method of claim 8 further comprising the steps of:

preparing the customer account including payment credit limit rules for the customer;

storing the customer account as an account control application in the customer accounts server;

downloading the account control application to the customer computer;

storing the account control application on the customer computer;

on receiving the merchant transaction identifier number and the payment request from the merchant computer, the customer computer sending the payment request to the account control application; and only if the payment request is within the payment credit limit rules, the customer computer accepting the transaction.

22. The method of claim 8 in which, on the merchant computer sending the merchant transaction identifier number and payment request to the customer computer, the additional steps are performed of:

the merchant computer sending product and billing information to the merchant accounts server, the merchant accounts server sending the product and billing information to the customer accounts server, and the customer accounts server sending the product and billing information to the customer computer.

23. The method of claim 8, further comprising the steps of:

the merchant computer opening communications with the system services server;

the merchant computer sending a coupon having a monetary value and redemption rules to the system services server;

the system services server sending the coupon to the customer computer;

the customer computer sending the coupon to the customer accounts server on sending the transaction acceptance message;

the customer accounts server sending the coupon to the merchant accounts server;

the merchant accounts server accepting the coupon to be used as at least part payment; and the merchant accounts server sending the coupon to the system services server on sending instructions to the system services server to cause payment to the merchant.

24. The method of claim 8, further comprising the steps of:

the merchant computer opening communications with the system services server;

the merchant computer sending a customer specific coupon having a monetary value and redemption rules to the system services server, together with a merchant transaction identifier number used to identify the customer computer to whom the customer specific coupon is to be sent;

the system services server sending the customer specific coupon to the customer computer;

the customer computer sending the customer specific coupon to the customer accounts server on sending the transaction acceptance message;

the customer accounts server sending the customer specific coupon to the merchant accounts server;

the merchant accounts server accepting the customer specific coupon to be used as at least part payment; and the merchant accounts server sending the customer specific coupon to the system services server on sending instructions to the system services server to cause payment to the merchant.

* * * * *

UNITED STATES PATENT AND TRADEMARK OFFICE
CERTIFICATE OF CORRECTION

PATENT NO. : 7,483,858 B2  
APPLICATION NO. : 10/216225  
DATED : January 27, 2009  
INVENTOR(S) : John Anthony Foran et al.

Page 1 of 1

It is certified that error appears in the above-identified patent and that said Letters Patent is hereby corrected as shown below:

ON THE TITLE PAGE:

In item (63), Related U.S. Application Data, change "Continuation-in-part of application No. PCT/IB01/00022, filed on Feb. 12, 2001" to --Continuation-in-part of application No. PCT/IE01/00022, filed on Feb. 12, 2001--.

IN THE SPECIFICATION:

Column 1, at lines 6 and 11, change "PCT/IB01/00022" to --PCT/IE01/00022--.

Signed and Sealed this  
Fifth Day of May, 2015

Michelle K. Lee  
*Director of the United States Patent and Trademark Office*